United States Patent
Mose et al.

(10) Patent No.: US 9,463,827 B2
(45) Date of Patent: Oct. 11, 2016

(54) ELECTRIC POWER STEERING APPARATUS AND STEERING EFFORT ASSIST CONTROLLING APPARATUS

(71) Applicant: HONDA MOTOR CO., LTD., Tokyo (JP)

(72) Inventors: Ryota Mose, Wako (JP); Norifumi Tamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/944,613

(22) Filed: Nov. 18, 2015

(65) Prior Publication Data
US 2016/0137221 A1    May 19, 2016

(30) Foreign Application Priority Data

Nov. 19, 2014 (JP) ................................ 2014-234527

(51) Int. Cl.
*B62D 11/00* (2006.01)
*B62D 5/04* (2006.01)

(52) U.S. Cl.
CPC ................................ *B62D 5/0463* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 5,941,338 A | * | 8/1999 | Miller | B62D 6/04 180/421 |
| 6,256,561 B1 | * | 7/2001 | Asanuma | B62D 15/025 180/197 |
| 6,675,928 B2 | * | 1/2004 | Takai | B62D 5/065 180/422 |
| 2002/0042671 A1 | * | 4/2002 | Chen | B60K 28/16 701/41 |
| 2004/0204808 A1 | * | 10/2004 | Satoh | B62D 6/005 701/41 |
| 2008/0078608 A1 | * | 4/2008 | Hara | B62D 15/0235 180/446 |
| 2008/0091318 A1 | * | 4/2008 | Deng | B62D 6/003 701/41 |
| 2011/0077824 A1 | * | 3/2011 | Barton | B62D 6/005 701/42 |

FOREIGN PATENT DOCUMENTS

JP    2010-149781 A    7/2010

* cited by examiner

*Primary Examiner* — Hussein A. Elchanti
(74) *Attorney, Agent, or Firm* — Westerman, Hattori, Daniels & Adrian, LLP (57) ABSTRACT

An electric power steering apparatus provides a steering assist force to the steering system of a vehicle by controlling driving of an assist motor in accordance with a steering force acting on the steering wheel. The electric power steering apparatus includes a yaw rate sensor that obtains a measured yaw rate of the vehicle, a vehicle speed sensor that detects the speed of the vehicle, a steering angle sensor that detects the steering angle of the steering wheel, and a torque estimating apparatus that estimates a self-aligning torque on the basis of the vehicle speed and data having a smaller absolute value among the measured yaw rate and the steering-angle standard yaw rate and that corrects the steering assist force on the basis of the estimated self-aligning torque.

4 Claims, 7 Drawing Sheets

ELECTRIC POWER STEERING APPARATUS AND STEERING EFFORT ASSIST CONTROLLING APPARATUS

CROSS REFERENCES TO RELATED APPLICATIONS

The present application claims priority under 35 U.S.C. §119 to Japanese Patent Application No. 2014-234527, filed Nov. 19, 2014, entitled "Electric Power Steering Apparatus and Steering Effort Assist Controlling Apparatus." The contents of this application are incorporated herein by reference in their entirety.

BACKGROUND

1. Field

The present disclosure relates to an electric power steering apparatus and a steering effort assist controlling (typically, a steering holding-state assist controlling) apparatus which provide a steering assist force to the steering system of a vehicle by controlling driving of an assist motor in accordance with a steering force acting on a steering member.

2. Description of the Related Art

In the related art, a known electric power steering apparatus has a configuration in which a steering assist force is provided to the steering system of a vehicle by controlling driving of an assist motor in accordance with a steering force acting on a steering member such as a steering wheel.

For example, an electric power steering apparatus disclosed in Japanese Unexamined Patent Application Publication No. 2010-149781 sets an additional friction torque which is to be provided to a steering wheel, on the basis of the actual steering angle, the target steering angle, and the like. In addition, the electric power steering apparatus exerts control for providing the additional friction torque to the steering wheel. An additional friction torque changing unit changes the additional friction torque on the basis of the length of a turning time.

When a vehicle turns over a long time, the electric power steering apparatus disclosed in Japanese Unexamined Patent Application Publication No. 2010-149781 provides an additional friction torque whose magnitude is determined in consideration of tiredness of the arms of the driver, to the steering wheel, enabling tiredness of the arms of the driver to be reduced when the steering wheel is held to keep the vehicle turning.

To reduce tiredness of the arms of the driver when the steering wheel is held to keep the vehicle turning, the electric power steering apparatus disclosed in Japanese Unexamined Patent Application Publication No. 2010-149781 makes the additional friction torque provided to the steering wheel larger as the turning time of the vehicle is longer. Therefore, a further steering operation performed when the steering wheel is held to keep the vehicle turning may cause the driver to feel steering with the steering wheel heavy.

SUMMARY

It is desirable to provide an electric power steering apparatus and a steering effort assist controlling apparatus which are capable of maintaining excellent steering feeling when the steering wheel is held to keep the vehicle turning.

According to a first aspect of the present disclosure, there is provided an electric power steering apparatus providing a steering assist force to a steering system of a vehicle by controlling driving of an assist motor in accordance with a steering force acting on a steering member. The electric power steering apparatus includes a measured-yaw-rate acquiring unit, a vehicle-speed detecting unit, a steering-angle detecting unit, a steering-angle standard yaw-rate calculating unit, and a torque estimating apparatus. The measured-yaw-rate acquiring unit acquires a measured yaw rate of the vehicle. The vehicle-speed detecting unit detects a speed of the vehicle. The steering-angle detecting unit detects a steering angle of the steering member. The steering-angle standard yaw-rate calculating unit calculates a steering-angle standard yaw rate by using the speed of the vehicle and the steering angle of the steering member. The torque estimating apparatus estimates a self-aligning torque occurring on a steered wheel of the vehicle, on the basis of the speed of the vehicle and any one of the measured yaw rate and the steering-angle standard yaw rate, and corrects the steering assist force on the basis of the estimated self-aligning torque. The torque estimating apparatus estimates the self-aligning torque on the basis of the speed of the vehicle and data having a smaller absolute value among the measured yaw rate and the steering-angle standard yaw rate.

According to the first aspect of the present disclosure, the electric power steering apparatus which provides a steering assist force to the steering system of a vehicle by controlling driving of an assist motor in accordance with a steering force acting on a steering member such as a steering wheel is assumed.

According to the first aspect of the present disclosure, the measured-yaw-rate acquiring unit obtains the measured yaw rate of the vehicle. The vehicle-speed detecting unit detects the speed of the vehicle. The steering-angle detecting unit detects the steering angle of the steering member. The steering-angle standard yaw-rate calculating unit calculates the steering-angle standard yaw rate by using the vehicle speed and the steering angle of the steering member. The torque estimating apparatus estimates the self-aligning torque (may be hereinafter abbreviated as "SAT") on the basis of the vehicle speed and data having a smaller absolute value among the measured yaw rate and the steering-angle standard yaw rate, and corrects the steering assist force on the basis of the estimated self-aligning torque. Thus, a steering torque produced when the steering wheel is held to keep the vehicle turning is reduced.

Significances with which the torque estimating apparatus estimates the self-aligning torque on the basis of the vehicle speed and data having a smaller absolute value among the measured yaw rate and the steering-angle standard yaw rate will be described.

The first significance is ensuring of reliability of the electric power steering apparatus, for example, when either of the measured yaw rate and the steering-angle standard yaw rate is larger than its proper value.

Assume that the measured-yaw-rate acquiring unit (for example, a yaw rate sensor) which obtains a measured yaw rate of the vehicle goes into an abnormal state and outputs a value larger than the proper value, as a measured yaw rate, and that the torque estimating apparatus estimates the self-aligning torque on the basis of the measured yaw rate having a large value. In this case, the torque estimating apparatus estimates the value larger than the proper value, as a self-aligning torque, and corrects a steering assist force on the basis of the self-aligning torque having a large value. As a result, a steering assist force having a value much larger than the proper value may be output.

For example, assume that the vehicle speed sensor or the steering angle sensor goes into an abnormal state, and outputs a value larger than the proper value, that the steering-angle standard yaw-rate calculating unit calculates the steering-angle standard yaw rate on the basis of the larger value, and that the torque estimating apparatus estimates the self-aligning torque on the basis of the calculated steering-angle standard yaw rate having a larger value. In this case, similarly to the above-described case, the torque estimating apparatus estimates a value larger than the proper value, as a self-aligning torque, and corrects the steering assist force on the basis of the self-aligning torque having a larger value. As a result, a steering assist force having a value much larger than the proper value may be output.

In the above-described case, a steering assist force which has a value much larger than the proper value and which is provided by the electric power steering apparatus to the steering system of a vehicle is not desirable because such a steering assist force damages reliability of the electric power steering apparatus.

The second significance is avoidance of a situation in which the steering member goes into a self-steering state, for example, when the vehicle which is turning travels on a positive cant road. A state in which the steering member goes into the self-steering state indicates a state in which the steering member is turned in a direction which is not intended by a driver. A positive cant road is a road whose surface inclines in the width direction of the road with respect to the traveling direction of a vehicle and on which a portion of the vehicle, which is turning, on the outboard side of the turn is higher than that on the inboard side of the turn.

When a vehicle which is turning travels on a positive cant road, the measured yaw rate is similar to that on a flat road. In contrast, since the steering angle is smaller than that on a flat road, the steering-angle standard yaw rate has a value smaller than that on a flat road in accordance with the road environment. In short, in the case where a vehicle which is turning travels on a positive cant road, the measured yaw rate has a value larger than the proper value.

At that time, assume that the torque estimating apparatus estimates the self-aligning torque on the basis of the measured yaw rate having a value larger than the proper value. In this case, the torque estimating apparatus estimates a value larger than the proper value, as a self-aligning torque. Receiving this data, a correction unit corrects a steering assist force on the basis of the self-aligning torque having a large value. As a result, a steering assist force having a value much larger than the proper value may be output.

In such a case, a steering assist force which has a value much larger than the proper value and which is provided by the electric power steering apparatus to the steering system of a vehicle is not desirable because, for example, such a steering assist force causes a concern that the steering member goes into the self-steering state, and damages reliability of the electric power steering apparatus.

Therefore, according to the first aspect of the present disclosure, the torque estimating apparatus employs a configuration in which a self-aligning torque is estimated on the basis of the vehicle speed and data having a smaller absolute value among the measured yaw rate and the steering-angle standard yaw rate, and in which a steering assist force is corrected on the basis of the estimated self-aligning torque.

According to the first aspect of the present disclosure, even if a situation occurs in which the measured yaw rate or the steering-angle standard yaw rate has an abnormal value (large value) in comparison with its proper value, an adverse effect of the abnormal value is avoided before the effect is shown, whereby excellent steering feeling felt when the steering wheel is held to keep the vehicle turning is maintained, causing reliability of the electric power steering apparatus to be ensured.

According to a second aspect of the present disclosure, a steering effort assist controlling apparatus is presumed which exerts control for supporting a steering holding state of a vehicle in such a manner that the apparatus determines whether or not the vehicle which is turning is in the steering holding state, in such a manner that, if the apparatus determines that the vehicle which is turning is in the steering holding state, the apparatus controls driving of an assist motor in accordance with a steering force acting on a steering member, and in such a manner that the apparatus provides a steering assist force to a steering system of the vehicle.

According to the second aspect of the present disclosure, the steering-angle standard yaw-rate calculating unit uses the vehicle speed and the steering angle of the steering member to calculate the steering-angle standard yaw rate. The torque estimating apparatus estimates the self-aligning torque on the basis of the vehicle speed and data having a smaller absolute value among the measured yaw rate and the steering-angle standard yaw rate, and corrects the steering assist force on the basis of the estimated self-aligning torque. Thus, a steering torque produced when the steering wheel is held to keep the vehicle turning is reduced.

According to the second aspect of the present disclosure, similarly to the first aspect of the present disclosure, even if a situation occurs in which the measured yaw rate or the steering-angle standard yaw rate has an abnormal value (large value) in comparison with its proper value, an adverse effect of the abnormal value is avoided before the effect is shown, whereby excellent steering feeling felt when the steering wheel is held to keep the vehicle turning is maintained, causing reliability of the steering effort assist controlling apparatus included in the electric power steering apparatus to be ensured.

According to a third aspect of the present disclosure, in the steering effort assist controlling apparatus according to the second aspect of the present disclosure, in the case where the measured yaw rate exceeds a turning threshold, where a steering speed of the steering member is less than a speed threshold, and where a state in which a cruise control apparatus mounted on the vehicle has been actuated continues for a predetermined time or more, it may be determined that the vehicle which is turning is in the steering holding state.

According to the third aspect of the present disclosure, the condition used when it is determined that the vehicle which is turning is in the steering holding state is clearly defined, whereby convenience may be provided for design in implementation of the steering effort assist controlling apparatus according to the present disclosure on the vehicle.

According to a fourth aspect of the present disclosure, in the steering effort assist controlling apparatus according to the third aspect of the present disclosure, the control for supporting the steering holding state of the vehicle may be stopped in the case where the measured yaw rate is less than the turning threshold, where the cruise control apparatus is not actuated, or where the steering force acting on the steering member exceeds a steering-power threshold.

According to the fourth aspect of the present disclosure, the condition used when control for supporting the steering holding state of the vehicle is stopped is clearly defined, whereby convenience may be provided for design in implementation of the steering effort assist controlling apparatus according to the present disclosure on the vehicle, and contribution to reduced energy requirements may be achieved.

DESCRIPTION OF THE PREFERRED EMBODIMENTS

An electric power steering apparatus according to an embodiment of the present disclosure will be described below in detail by referring to the drawings.

In the figures illustrated below, members having the same function, or members having functions corresponding to each other are designated with the same reference numeral as a rule. For convenience of description, the size and the shape of a member may be modified or exaggerated so as to be schematically illustrated.

Figure 1:
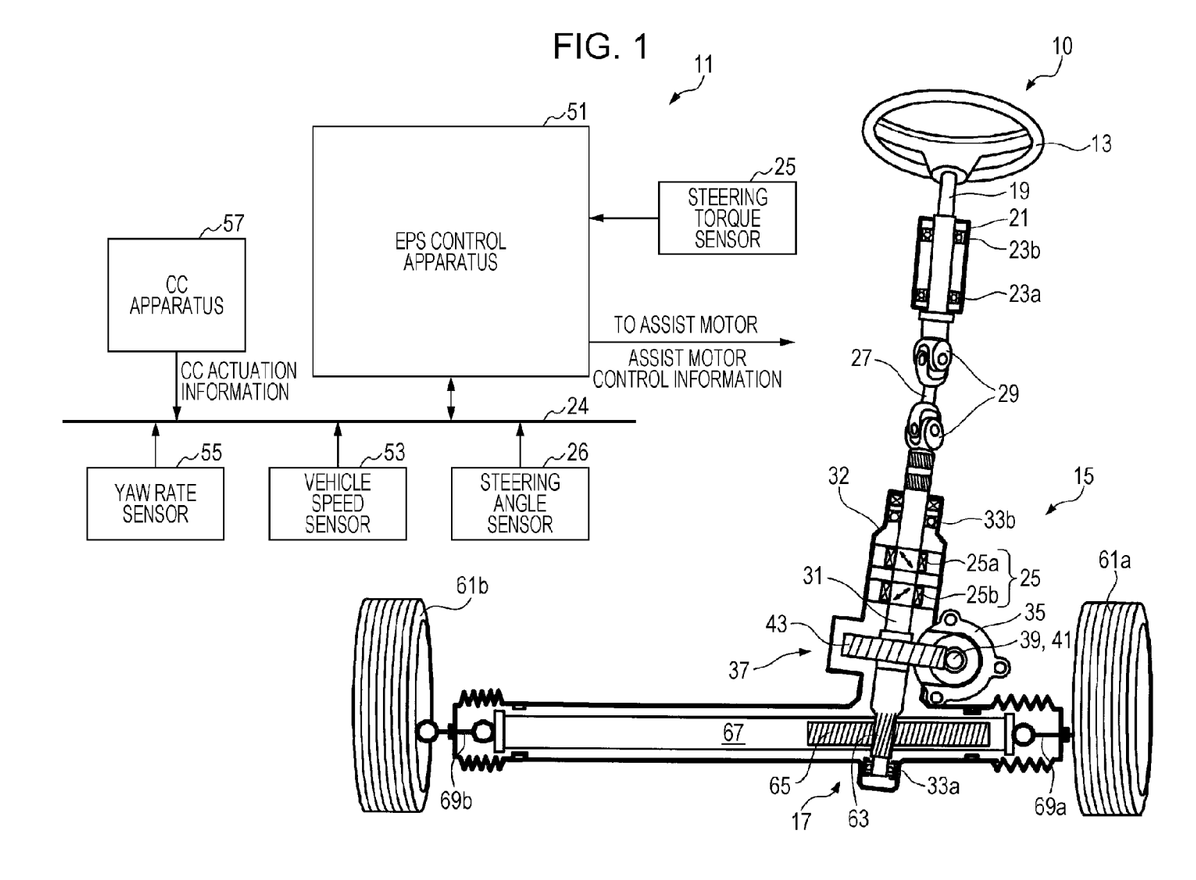
FIG. 1 is a schematic diagram illustrating the configuration of an electric power steering apparatus according to an embodiment of the present disclosure.

Configuration of Steering Apparatus 10 in Coordination with Electric Power Steering Apparatus 11 According to the Embodiment of the Present Disclosure Prior to description of an electric power steering apparatus 11 according to the embodiment of the present disclosure, the configuration of a steering apparatus 10 in coordination with the electric power steering apparatus 11 will be described with reference to FIG. 1. FIG. 1 is a schematic diagram illustrating the configuration of the electric power steering apparatus 11 according to the embodiment of the present disclosure.

As illustrated in FIG. 1, the steering apparatus 10 includes a steering wheel 13, a steering assisting apparatus 15, and a steering-force transmitting apparatus 17.

The steering wheel 13 corresponding to a "steering member" in the present disclosure is a member operated when a driver tries to change the traveling direction of his/her vehicle (not illustrated) to a desired direction. The center portion of the steering wheel 13 is coupled to a first end of a steering shaft 19. The steering shaft 19 is supported by an upper housing 21 via bearings 23a and 23b provided in a lower portion and an upper portion, respectively, of the upper housing 21, in such a manner that the steering shaft 19 is rotatable.

The steering shaft 19 is provided with a steering angle sensor 26 which detects the steering angle of the steering wheel 13. The steering angle information obtained through the detection performed by the steering angle sensor 26 is supplied to an electric power steering (EPS) control apparatus 51 via a communication medium 24.

A second end of the steering shaft 19 which is on the opposite side to the first end at which the steering wheel 13 is provided is coupled to a steering-force transmitting shaft 31 via an intermediate shaft portion 27 and a pair of universal joints 29 which are connected in series. The steering-force transmitting shaft 31 is supported by a lower housing 32 via a pair of bearings 33a and 33b provided in a lower portion and an upper portion, respectively, of the lower housing 32, in such a manner that the steering-force transmitting shaft 31 is rotatable.

In the lower housing 32, a magnetostrictive steering torque sensor 25 is provided so as to surround the steering-force transmitting shaft 31. On the steering-force transmitting shaft 31, a magnetostrictive film (not illustrated) formed, for example, from Ni—Fe plating is provided so as to cover a portion which extends in the circumferential direction of the steering-force transmitting shaft 31 and which faces the steering torque sensor 25. The steering torque sensor 25 has a function of determining the magnitude of a steering torque, for example, by using first and second solenoid coils 25a and 25b in such a manner that the steering torque sensor 25 is not in contact with the steering-force transmitting shaft 31. The steering torque is received by the steering-force transmitting shaft 31 via the steering wheel 13, the steering shaft 19, the intermediate shaft portion 27, and the pair of universal joints 29.

The principle of detecting a steering torque by using the magnetostrictive steering torque sensor 25 will be described. When the steering-force transmitting shaft 31 receives a steering torque, distortion in the tensile direction (+45° direction) and the compression direction (−45° direction) occurs on the surface of the steering-force transmitting shaft 31. At that time, the magnetic permeability in the tensile direction increases, whereas the magnetic permeability in the compression direction decreases. This phenomenon is called the "magnetostrictive effect". The first coil 25a is provided so that magnetic flux passes in the direction in which the magnetic permeability increases. In contrast, the second coil 25b is provided so that magnetic flux passes in the direction in which the magnetic permeability decreases.

Inductance increases in the first coil 25a provided so that magnetic flux passes in the direction in which the magnetic permeability increases, whereas inductance decreases in the second coil 25b provided so that magnetic flux passes in the direction in which the magnetic permeability decreases. The first coil 25a and the second coil 25b are bridge-connected, and the differential voltage is amplified by using a differential amplifier circuit (not illustrated) and output. Thus, an output voltage (steering torque information) proportional to the steering torque may be determined.

The steering torque information determined by the steering torque sensor 25 is supplied to the electric power steering control apparatus (may be hereinafter abbreviated as an "EPS control apparatus") 51 which is described below. A configuration may be employed in which the steering torque information is supplied to the EPS control apparatus 51 via the communication medium 24 such as a controller area network (CAN).

The steering assisting apparatus 15 provided for the steering-force transmitting shaft 31 has a function of providing an assist force produced for a manual operation using the steering wheel 13 which is performed by the driver. The steering assisting apparatus 15 includes a deceleration mechanism 37 and an assist motor 35 which supplies an assist force (steering reaction force) for reducing (including adjustment of a response) a steering torque of the steering wheel 13 produced by a manual operation performed by the driver.

The deceleration mechanism 37 has a worm gear 41 coupled to an output shaft portion 39 of the assist motor 35, and a worm wheel gear 43 engaged with the worm gear 41. The worm wheel gear 43 is provided in a middle portion in the axis direction of the steering-force transmitting shaft 31 so as to rotate together with the steering-force transmitting shaft 31. The deceleration mechanism 37 is provided so as to intervene between the output shaft portion 39 of the assist motor 35 and the steering-force transmitting shaft 31.

Thus, the worm wheel gear 43 transfers a driving force of the assist motor 35 to the steering wheel 13 via the deceleration mechanism 37, the steering-force transmitting shaft 31, the steering shaft 19, and the like. At the same time, the worm wheel gear 43 has a function of transferring the driving force to steered wheels 61a and 61b via the steering-force transmitting apparatus 17.

The assist motor 35 is integrally provided with a resolver (not illustrated) which determines and outputs rotation angle information of the assist motor 35. The rotation angle information of the assist motor 35 which is determined by the resolver is supplied to the EPS control apparatus 51.

The steering-force transmitting apparatus 17 has a function of transmitting a steering force (steering torque) which is produced by the driver and which is received via the steering wheel 13 and the steering shaft 19, to the steered wheels 61a and 61b. The steering-force transmitting apparatus 17 includes a pinion gear 63 provided for the steering-force transmitting shaft 31, a rack shaft 67 which has rack teeth 65 engaged with the pinion gear 63 and which is capable of reciprocating in the vehicle width direction, tie-rods 69a and 69b which are provided on the ends of the rack shaft 67, and the steered wheels 61a and 61b which are provided via the tie-rods 69a and 69b in such a manner that the steered wheels 61a and 61b are rotatable.

Configuration of Electric Power Steering Apparatus 11 According to the Embodiment of the Present Disclosure The configuration of the electric power steering apparatus 11 according to the embodiment of the present disclosure will be described with reference to FIG. 1.

As illustrated in FIG. 1, the electric power steering apparatus 11 includes the steering assisting apparatus 15 and the EPS control apparatus 51. The EPS control apparatus 51 is connected to the communication medium 24. In addition to the above-described steering angle sensor 26, a vehicle speed sensor 53 which detects the speed (vehicle speed) of the vehicle, a yaw rate sensor 55 which determines and outputs a measured yaw rate of the vehicle, and a cruise control apparatus (hereinafter abbreviated as a "CC apparatus") 57 which controls constant traveling of the vehicle are connected to the communication medium 24. Cruise control (CC) actuation information including the actuation state of the CC apparatus 57 is supplied to the EPS control apparatus 51 via the communication medium 24.

Configuration of EPS Control Apparatus 51

Figure 2:
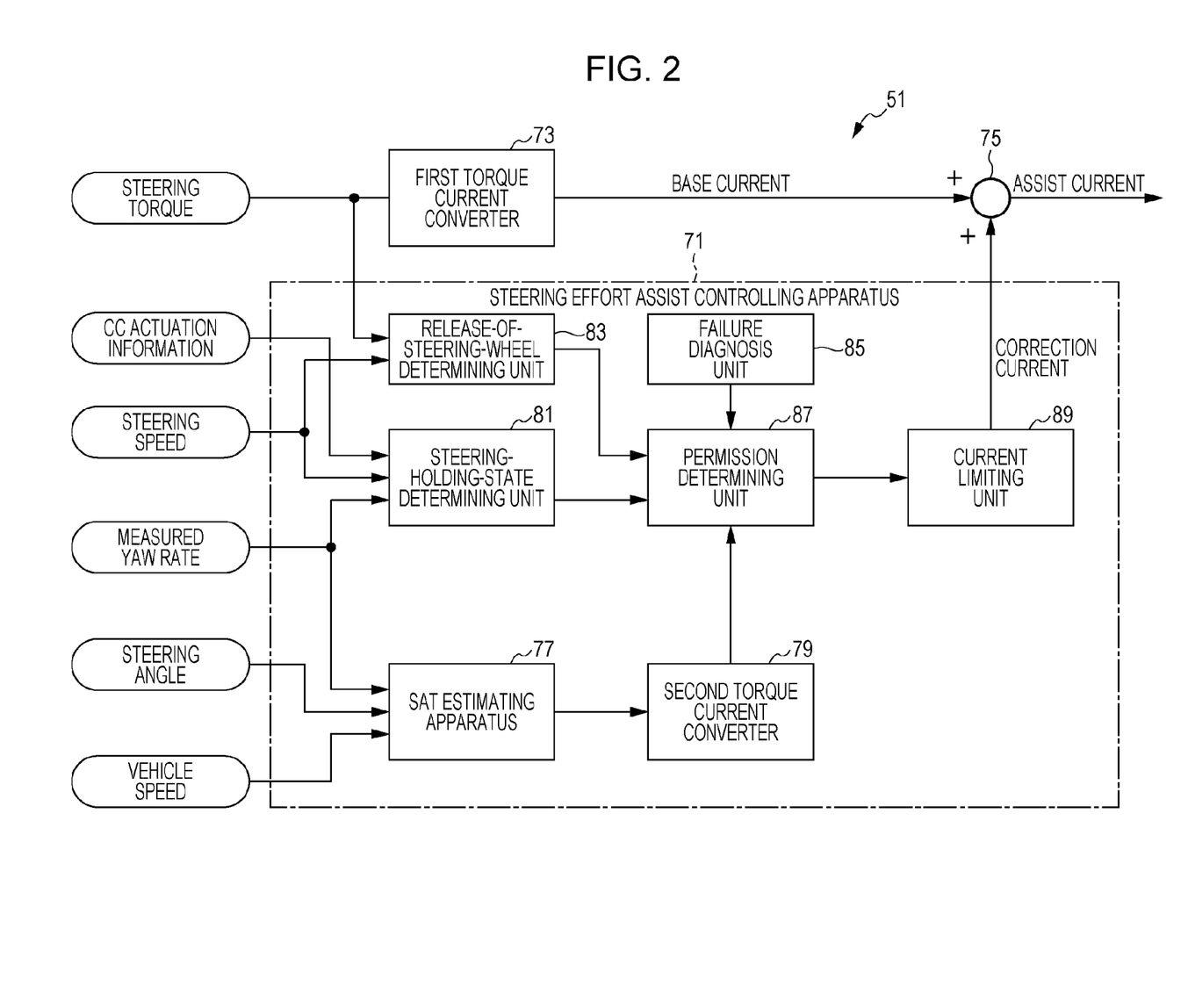
FIG. 2 is a block diagram illustrating the configuration of an electric power steering (EPS) control apparatus including a steering effort assist controlling apparatus.
Figure 3:
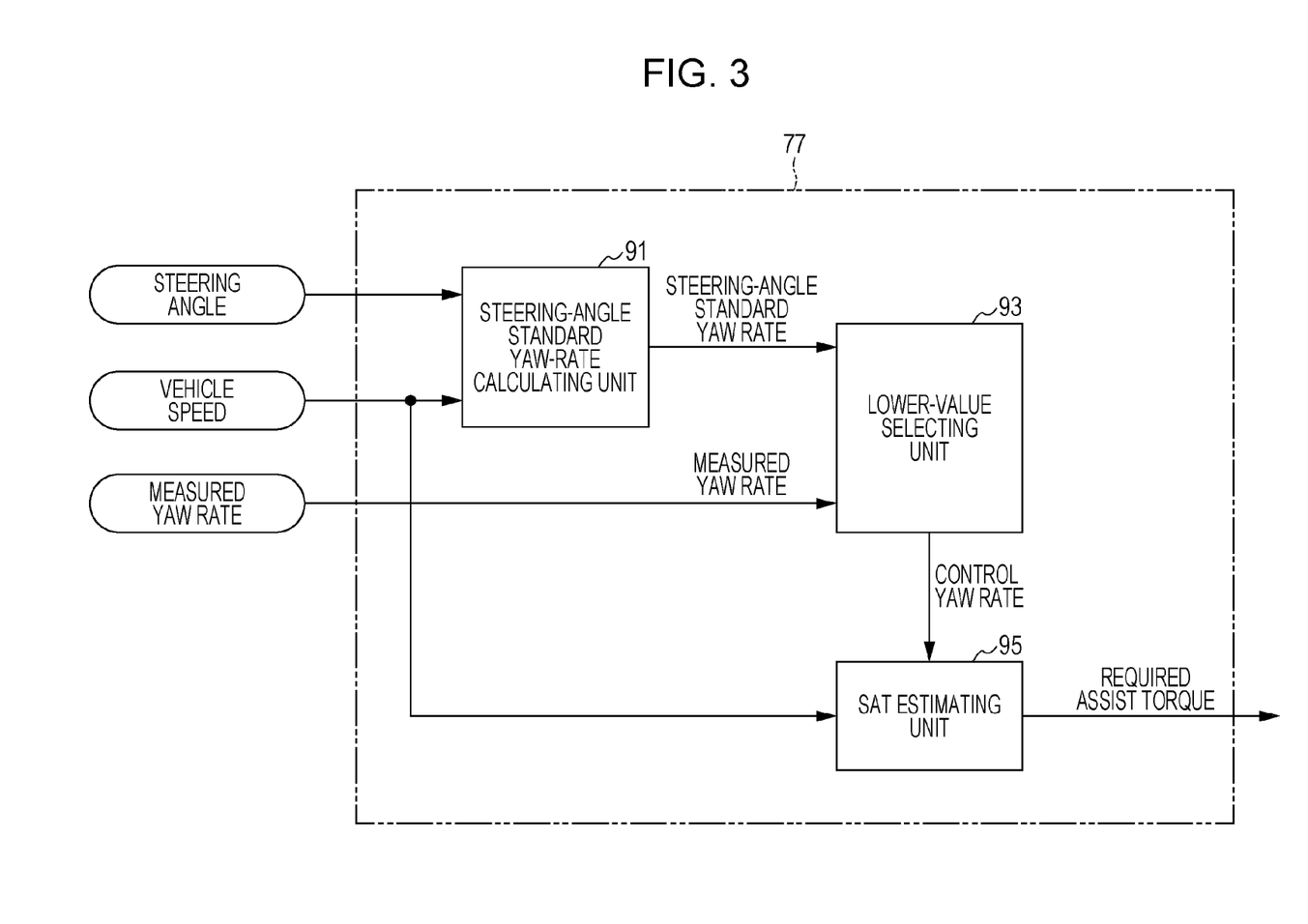
FIG. 3 is a block diagram illustrating the configuration of a self-aligning torque (SAT) estimating apparatus included in the steering effort assist controlling apparatus.

The EPS control apparatus 51 including a steering effort assist controlling apparatus 71 will be described with reference to FIGS. 2 and 3. FIG. 2 is a block diagram illustrating the configuration of the EPS control apparatus 51 including the steering effort assist controlling apparatus 71. FIG. 3 is a block diagram illustrating the configuration of a self-aligning torque (SAT) estimating apparatus 77 included in the steering effort assist controlling apparatus 71.

The EPS control apparatus 51 has the following function. The EPS control apparatus 51 refers to various types of information, such as steering torque information determined by the steering torque sensor 25 from moment to moment, steering angle information determined by the steering angle sensor 26, vehicle speed information determined by the vehicle speed sensor 53, and rotation angle information of the assist motor 35 determined by the resolver. The EPS control apparatus 51 calculates the value of target current (assist current) to be supplied to the assist motor 35, and exerts control so that the value of actual current flowing through the assist motor 35 changes in accordance with the value of the assist current. Accordingly, a steering force required when the driver turns the steering wheel 13 is reduced. The EPS control apparatus 51 includes a microcomputer which performs arithmetic processing, and various types of peripheral circuits including a drive control circuit for the assist motor 35.

To be more specific, as illustrated in FIG. 2, the EPS control apparatus 51 includes the steering effort assist controlling apparatus 71, a first torque current converter 73, and an adding unit 75.

As illustrated in FIG. 2, the steering effort assist controlling apparatus 71 includes the SAT estimating apparatus 77, a second torque current converter 79, a steering-holding-state determining unit 81, a release-of-steering-wheel determining unit 83, a failure diagnosis unit 85, a permission determining unit 87, and a current limiting unit 89. The SAT estimating apparatus 77 estimates a self-aligning torque which occurs on a steered wheel (not illustrated) of the vehicle, and corrects a steering assist force on the basis of the estimated self-aligning torque.

As illustrated in FIG. 3, the SAT estimating apparatus 77 includes a steering-angle standard yaw-rate calculating unit 91, a lower-value selecting unit 93, and a SAT estimating unit 95.

The steering-angle standard yaw-rate calculating unit 91 has a function of calculating a steering-angle standard yaw rate by using the steering angle data determined by the steering angle sensor 26 and the vehicle speed data determined by the vehicle speed sensor 53. The steering-angle standard yaw rate calculated by the steering-angle standard yaw-rate calculating unit 91 is output to the lower-value selecting unit 93.

The lower-value selecting unit 93 selects yaw rate data having a lower value, from the measured yaw rate data obtained through measurement performed by the yaw rate sensor 55 and the steering-angle standard yaw rate calculated by the steering-angle standard yaw-rate calculating unit 91. The selected yaw rate data is output as control yaw rate data to the SAT estimating unit 95.

The SAT estimating unit 95 has a function of estimating a self-aligning torque (SAT) which occurs on a steered wheel of the vehicle and correcting a steering assist force on the basis of the estimated self-aligning torque. Specifically, the SAT estimating unit 95 estimates a self-aligning torque occurring on the steered wheel while the vehicle is turning, on the basis of the vehicle speed data and the control yaw rate data (data having a smaller absolute value among the measured yaw rate and the steering-angle standard yaw rate) in consideration of a SAT constant derived from specifications of the vehicle, and calculates and obtains a required assist torque for canceling the self-aligning torque obtained through the estimation. It may be assumed that the self-aligning torque is determined, for example, by using a function using the control yaw rate data, the vehicle speed data, and the SAT constant.

The self-aligning torque may be estimated by using a known method as appropriate, such as a method disclosed in Japanese Unexamined Patent Application Publication No. 2007-50743, the entire contents of which are incorporated herein by reference.

The required assist torque thus obtained is output to the second torque current converter 79 located downstream of the SAT estimating apparatus 77 in the steering effort assist controlling apparatus 71 illustrated in FIG. 2.

Returning back to the description of the steering effort assist controlling apparatus 71, as illustrated in FIG. 2, the second torque current converter 79 has a function of converting the required assist torque which is output from the SAT estimating apparatus 77 into correction current data for the assist motor 35. The correction current data for the assist motor 35 obtained through the conversion performed by the second torque current converter 79 is output to the permission determining unit 87.

Figure 4:
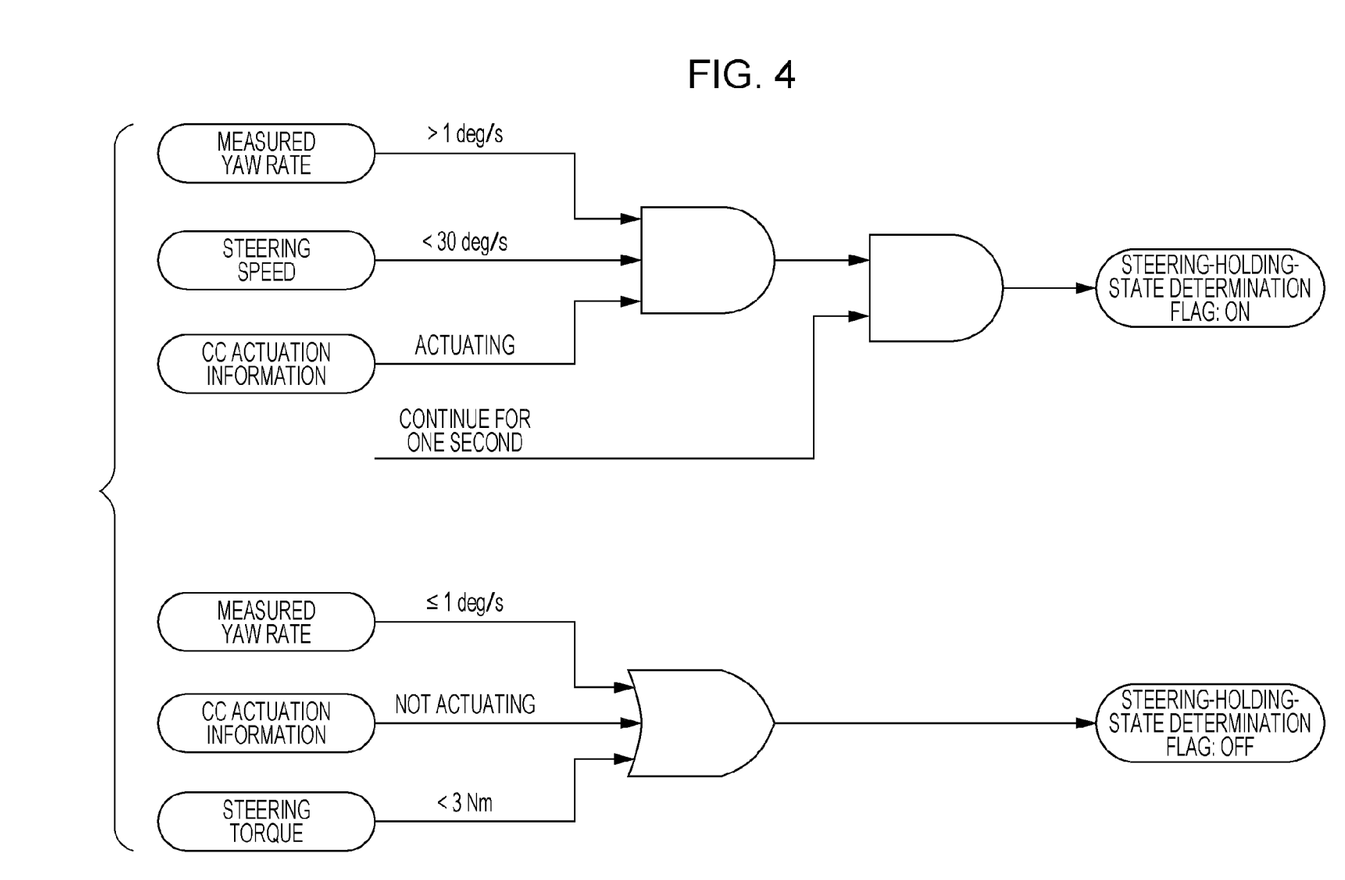
FIG. 4 is a logical circuit diagram used for description about operations of a steering-holding-state determining unit.

The steering-holding-state determining unit 81 has a function of determining whether or not the vehicle which is turning is in the steering holding state. The determination result made by the steering-holding-state determining unit 81 is transmitted to the permission determining unit 87. The determination procedure performed by the steering-holding-state determining unit 81 will be described with reference to FIG. 4. FIG. 4 is a logical circuit diagram used for description about operations of the steering-holding-state determining unit 81.

The condition on which the steering-holding-state determining unit 81 determines that the vehicle which is turning is in the steering holding state, and on which the steering-holding-state determining unit 81 turns on a steering-holding-state determination flag is as follows. That is, as illustrated in FIG. 4, in the case where the measured yaw rate exceeds a turning threshold, e.g., a value such as 1 deg/s which is appropriately set (i.e., the vehicle is turning), where the steering speed of the steering member is less than a speed threshold, e.g., a value such as 30 deg/s which is appropriately set (i.e., the steering position of the steering wheel 13 is almost the same), and where a state in which the CC apparatus 57 has been actuated continues for a predetermined period (for example, a value such as a second which is appropriately set) or more, it is determined that the vehicle which is turning is in the steering holding state. Then, the steering-holding-state determining unit 81 turns on the steering-holding-state determination flag.

In contrast, as illustrated in FIG. 4, in the case where the measured yaw rate is equal to or less than the turning threshold such as 1 deg/s (i.e., the vehicle is not turning), where the CC apparatus 57 is not actuated, or where the steering torque is less than a torque threshold, e.g., a value such as 3 N·m which is appropriately set (i.e., the vehicle is not in the steering holding state), it is determined that the vehicle is not in the steering holding state even when the vehicle is turning. Then, the steering-holding-state determining unit 81 turns off the steering-holding-state determination flag.

The release-of-steering-wheel determining unit 83 has a function of determining whether or not the driver releases his/her hands from the steering wheel 13. The determination result made by the release-of-steering-wheel determining unit 83 is transmitted to the permission determining unit 87. The reason why the release-of-steering-wheel determining unit 83 is present is as follows. That is, in a period after steering effort assist control for supporting the steering holding state of the vehicle which is turning is started, drive control for the assist motor 35 is performed so that the self-aligning torque is cancelled. Therefore, a phenomenon in which it is hard for the steering wheel 13 to return back to the neutral position arises when the vehicle is located near the exit of the winding road where the turning ends.

Therefore, it is determined whether or not the driver releases his/her hands from the steering wheel 13 (including a state in which a force for holding the steering wheel 13 is decreased). The release-of-steering-wheel determination result is fed back to the steering effort assist control (for example, when it is determined that the steering wheel is released, a steering assist force produced by the assist motor 35 is decreased), whereby occurrence of the phenomenon in which it is hard for the steering wheel 13 to return back to the neutral position is suppressed.

Figure 5:
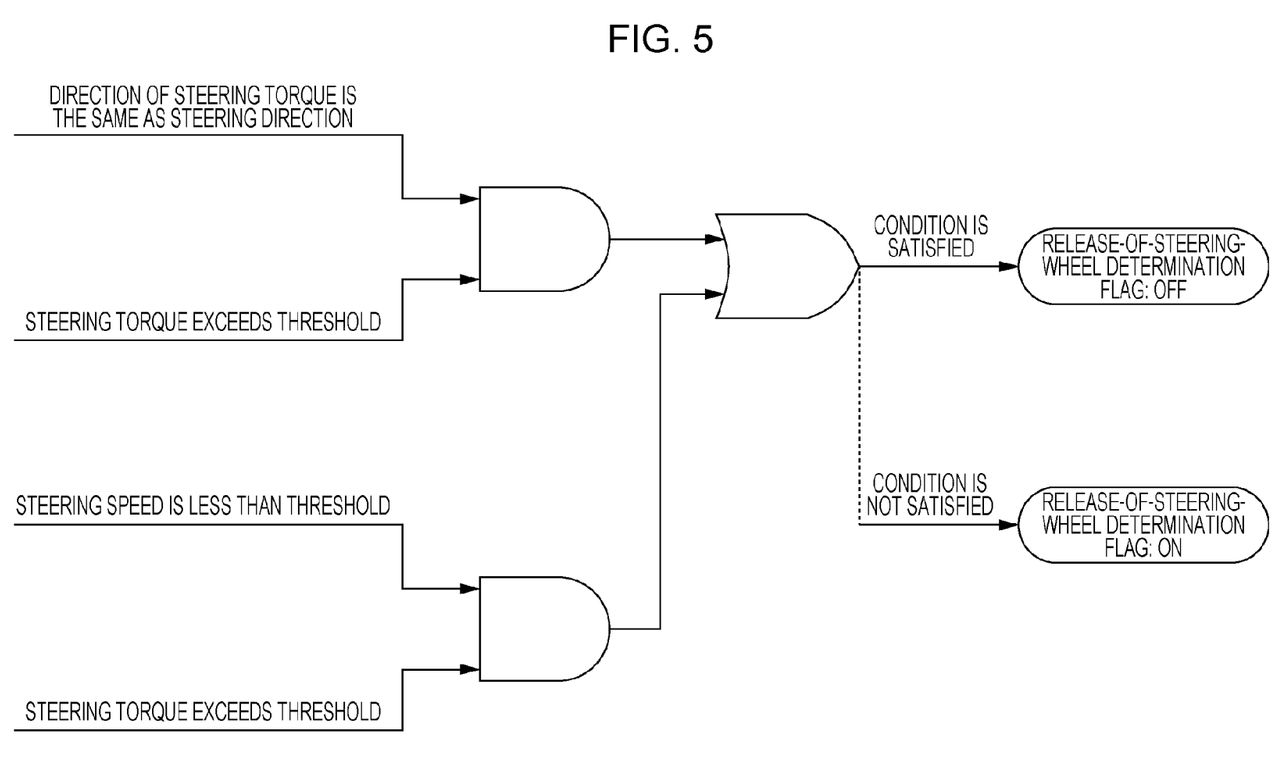
FIG. 5 is a logical circuit diagram used for description about operations of a release-of-steering-wheel determining unit.

The determination procedure performed by the release-of-steering-wheel determining unit 83 will be described with reference to FIG. 5. FIG. 5 is a logical circuit diagram used for description about operations of the release-of-steering-wheel determining unit 83.

The condition on which the release-of-steering-wheel determining unit 83 determines that the driver releases his/her hands from the steering wheel 13, and on which the release-of-steering-wheel determining unit 83 turns on a release-of-steering-wheel determination flag is as follows. That is, as illustrated in FIG. 5, in the case where a first condition which indicates a case in which the driver performs a normal driving operation is satisfied or where a second condition which indicates a case in which the vehicle is in the steering holding state is satisfied, it is determined that the driver does not release his/her hands from the steering wheel 13, and the release-of-steering-wheel determining unit 83 turns off the release-of-steering-wheel determination flag. The first condition is that the direction of the steering assist force (steering torque) produced by the assist motor 35 matches the steering direction of the steering wheel 13, and that the steering torque exceeds the predetermined torque threshold. The second condition is that the steering speed is less than the speed threshold (a value which may indicate a state in which positive steering is not performed) and that the steering torque exceeds the predetermined torque threshold.

In contrast, as illustrated in FIG. 5, in the case where the first condition is not satisfied (a case in which the driver does not perform a normal driving operation, such as a case in which the vehicle is stopping), and where the second condition is not satisfied (a case in which the vehicle is not in the steering holding state, such as a case in which the vehicle is stopping), it is determined that the driver releases his/her hands from the steering wheel 13, and the release-of-steering-wheel determining unit 83 turns on the release-of-steering-wheel determination flag.

Figure 6:
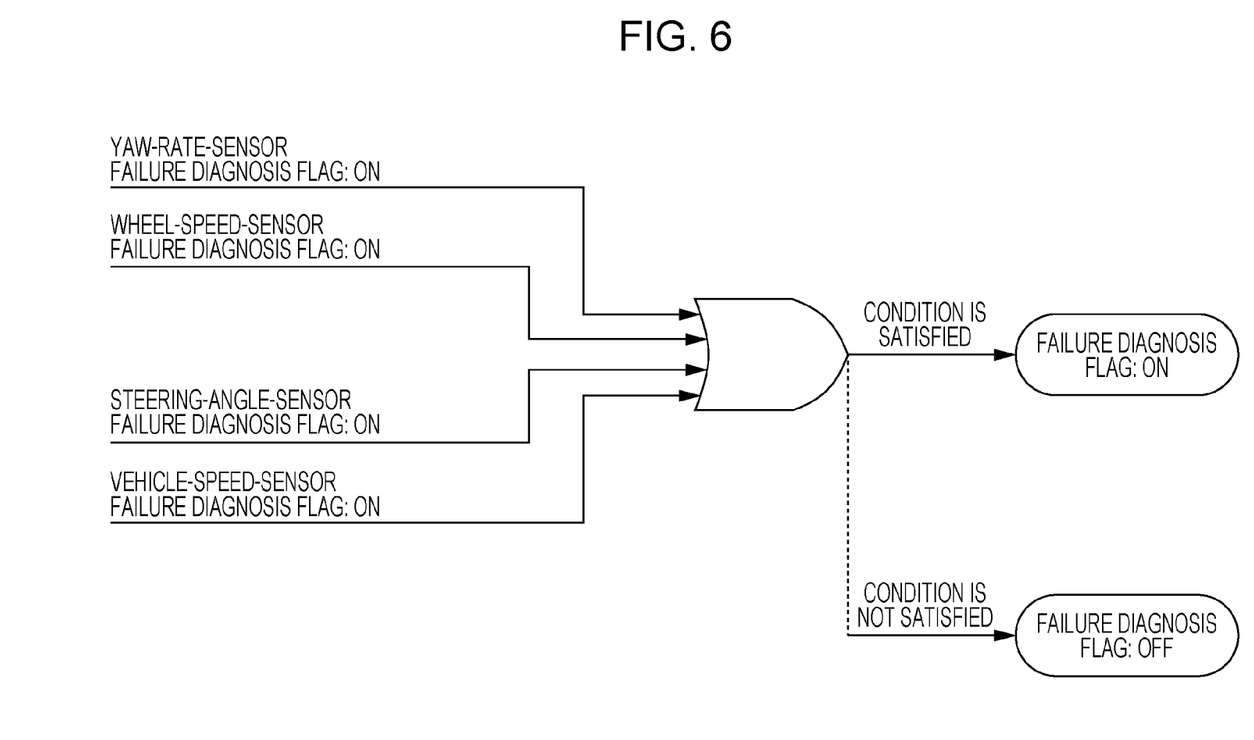
FIG. 6 is a logical circuit diagram used for description about operations of a failure diagnosis unit.

The failure diagnosis unit 85 has a function of making failure diagnosis for various types of sensors including the steering angle sensor 26, the vehicle speed sensor 53, a wheel speed sensor (not illustrated), and the yaw rate sensor 55. The failure diagnosis result made by the failure diagnosis unit 85 is transmitted to the permission determining unit 87. The failure diagnosis procedure performed by the failure diagnosis unit 85 will be described with reference to FIG. 6. FIG. 6 is a logical circuit diagram used for description about operations of the failure diagnosis unit 85.

The condition on which the failure diagnosis unit 85 determines that any of the sensors goes into an abnormal state, and on which the failure diagnosis unit 85 turns on a failure diagnosis flag is as follows. That is, as illustrated in FIG. 6, in the case where a failure diagnosis flag indicating that the yaw rate sensor 55 goes into an abnormal state is on, where a failure diagnosis flag indicating that the wheel speed sensor goes into an abnormal state is on, where a failure diagnosis flag indicating that the steering angle sensor 26 goes into an abnormal state is on, or where a failure diagnosis flag indicating that the vehicle speed sensor 53 goes into an abnormal state is on, it is determined that any of the sensors goes into an abnormal state, and the failure diagnosis unit 85 turns on the failure diagnosis flag.

In contrast, as illustrated in FIG. 6, in the case where the failure diagnosis flag indicating that the yaw rate sensor 55 goes into an abnormal state is off, where the failure diagnosis flag indicating that the wheel speed sensor goes into an abnormal state is off, where the failure diagnosis flag indicating that the steering angle sensor 26 goes into an abnormal state is off, and where the failure diagnosis flag indicating that the vehicle speed sensor 53 goes into an abnormal state is off, it is determined that all of the sensors are in the normal state, and the failure diagnosis unit 85 turns off the failure diagnosis flag.

The permission determining unit 87 has a function as a gate for determining whether or not the correction current data for the assist motor 35 which is obtained through the conversion performed by the second torque current converter 79 is to be output to the current limiting unit 89 located downstream. More specifically, in the case where the vehicle which is turning is in the steering holding state (the steering-holding-state determination flag is on), where the driver does not release his/her hands from the steering wheel 13 (the release-of-steering-wheel determination flag is off), and where all of the sensors are in the normal state (the failure diagnosis flag is off), the permission determining unit 87 makes permission determination that the correction current data for the assist motor 35 which is obtained through the conversion performed by the second torque current converter 79 is to be output to the current limiting unit 89 located downstream.

The current limiting unit 89 has a function of limiting the correction current data for the assist motor 35 which is obtained through the conversion performed by the second torque current converter 79 and which passes through the permission determination performed by the permission determining unit 87, to an appropriate value. Specifically, the current limiting unit 89 limits current so that the value of the correction current for the assist motor 35 converges into an allowable range determined with predetermined lower and upper values. The allowable range determined with the predetermined lower and upper values may be appropriately set in consideration that the allowable range is adequate as a correction value for cancelling the self-aligning torque. The correction current data for the assist motor 35 which has been subjected to the process performed by the current limiting unit 89 is output to the adding unit 75.

Preferably, the current limiting unit 89 outputs the value of the correction current for the assist motor 35 to the adding unit 75 so that the value of the correction current gradually increases (gradually decreases) over a predetermined delay time. This is because an assist force for the steering wheel 13 which is radically changed gives the driver a sense of incongruity. The above-described delay time may be variably set in accordance with the absolute value of the correction current so that the delay time used when the absolute value of the correction current is large is made longer than that used when the absolute value of the correction current is smaller than the large absolute value.

The first torque current converter 73 has a function of converting the steering torque information determined by the steering torque sensor 25 into the value of base current for the assist motor 35. The base current data for the assist motor 35 obtained after the conversion performed by the first torque current converter 73 is output to the adding unit 75.

The adding unit 75 has a function of adding the value of the base current for the assist motor 35 obtained after the conversion performed by the first torque current converter 73 to the value of the correction current for the assist motor 35 obtained after the process performed by the current limiting unit 89 and outputting the result as assist current data for the assist motor 35. The EPS control apparatus 51 exerts control so that the value of actual current flowing through the assist motor 35 is changed in accordance with the assist current data for the assist motor 35 obtained after the addition performed by the adding unit 75. In this way, the EPS control apparatus 51 operates so that a steering force required when the driver turns the steering wheel 13 is reduced.

Figure 7:
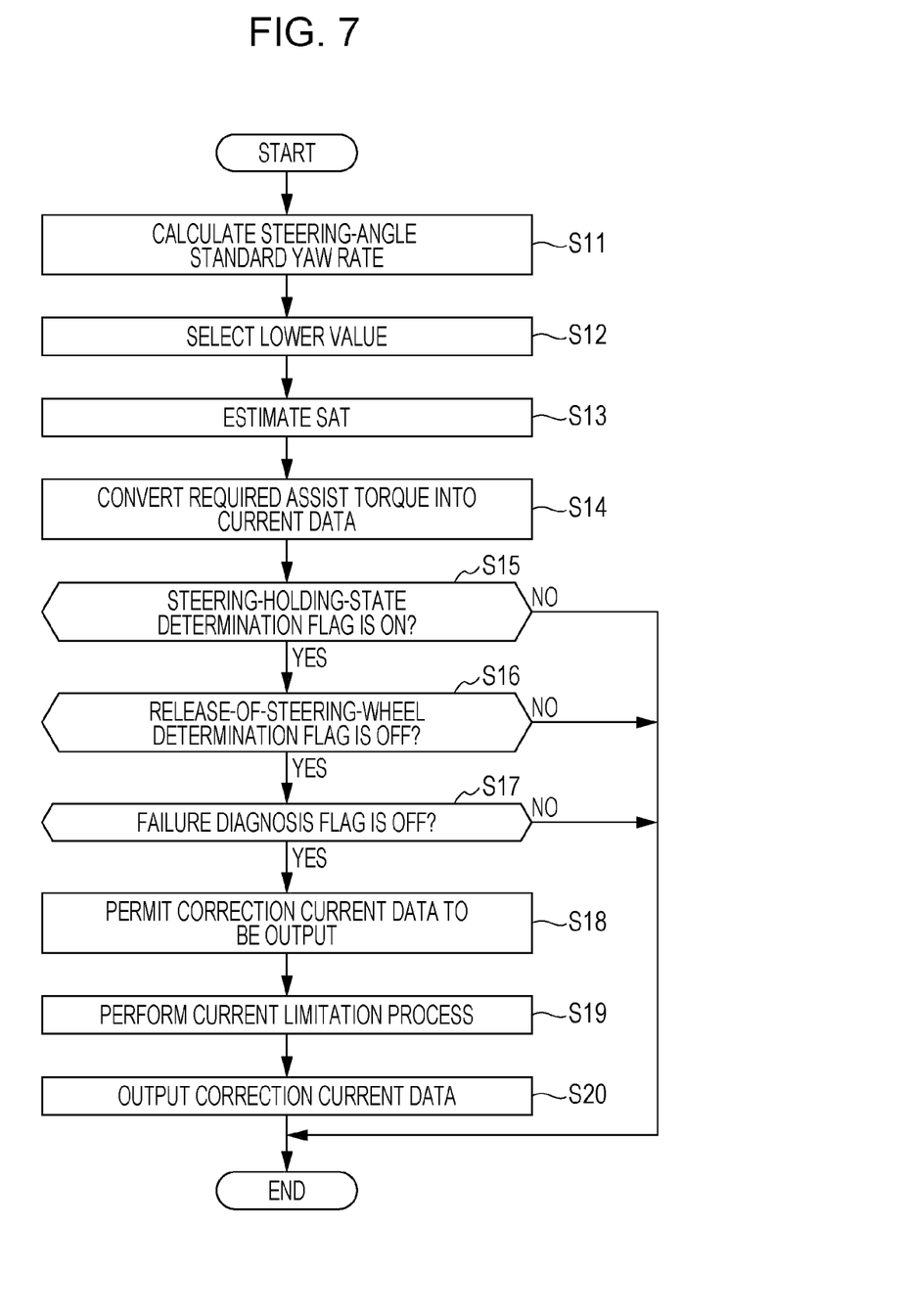
FIG. 7 is a flowchart used for description about operations of the steering effort assist controlling apparatus.

Operations of Steering Effort Assist Controlling Apparatus 71 According to the Embodiment of the Present Disclosure Operations of the steering effort assist controlling apparatus 71 according to the embodiment of the present disclosure will be described with reference to FIG. 7. FIG. 7 is a flowchart used for description about the operations of the steering effort assist controlling apparatus 71.

In step S11, the steering-angle standard yaw-rate calculating unit 91 uses the steering angle data determined by the steering angle sensor 26 and the vehicle speed data determined by the vehicle speed sensor 53 to calculate the steering-angle standard yaw rate.

In step S12, the lower-value selecting unit 93 selects yaw rate data having a lower value, from the measured yaw rate data measured by the yaw rate sensor 55 and the steering-angle standard yaw rate calculated by the steering-angle standard yaw-rate calculating unit 91, and outputs the selected yaw rate data as control yaw rate data to the SAT estimating unit 95.

In step S13, the SAT estimating unit 95 estimates a self-aligning torque occurring on a steered wheel while the vehicle is turning, on the basis of the control yaw rate data and the vehicle speed data, and obtains, through calculation, a required assist torque for cancelling the self-aligning torque obtained through the estimation.

In step S14, the second torque current converter 79 converts the required assist torque which is output from the SAT estimating apparatus 77 into correction current data for the assist motor 35.

In step S15, the steering-holding-state determining unit 81 determines whether or not the vehicle which is turning is in the steering holding state (whether or not the steering-holding-state determination flag is on). If the determination result in step S15 is that the vehicle which is turning is in the steering holding state, i.e., the steering-holding-state determination flag is on (YES in step S15), the steering effort assist controlling apparatus 71 proceeds the process to the next step, i.e., step S16.

If the determination result in step S15 is that the vehicle which is turning is not in the steering holding state, i.e., the steering-holding-state determination flag is off (NO in step S15), the steering effort assist controlling apparatus 71 ends the process.

In step S16, the release-of-steering-wheel determining unit 83 determines whether the driver does not release his/her hands from the steering wheel 13 (whether or not the release-of-steering-wheel determination flag is off). If the determination result in step S16 is that the driver does not release his/her hands from the steering wheel 13, i.e., the release-of-steering-wheel determination flag is off (YES in step S16), the steering effort assist controlling apparatus 71 proceeds the process to the next step, i.e., step S17.

If the determination result in step S16 is that the driver releases his/her hands from the steering wheel 13, i.e., the release-of-steering-wheel determination flag is on (NO in step S16), the steering effort assist controlling apparatus 71 ends the process.

In step S17, the failure diagnosis unit 85 determines whether or not any of the sensors goes into an abnormal state (whether or not the failure diagnosis flag is off). If the determination result in step S17 is that all of the sensors are in the normal state, i.e., the failure diagnosis flag is off (YES in step S17), the steering effort assist controlling apparatus 71 proceeds the process to the next step, i.e., step S18.

If the determination result in step S17 is that either of the sensors goes into an abnormal state, i.e., the failure diagnosis flag is on (NO in step S17), the steering effort assist controlling apparatus 71 ends the process.

In step S18, in the case where the vehicle which is turning is in the steering holding state (YES in step S15: the steering-holding-state determination flag is on), where the driver does not release his/her hands from the steering wheel 13 (YES in step S16: the release-of-steering-wheel determination flag is off), and where all of the sensors are in the normal state (YES in step S17: the failure diagnosis flag is off), the permission determining unit 87 makes permission determination that the correction current data for the assist motor 35 which is obtained through the conversion performed by the second torque current converter 79 is to be output to the current limiting unit 89 located downstream. This is because this case is an adequate case in which the correction current for cancelling the self-aligning torque is to be provided to the assist motor 35.

In step S19, the current limiting unit 89 performs a process (current limitation process) of limiting the correction current data for the assist motor 35 which is obtained through the conversion performed by the second torque current converter 79 and which has passed through the permission determination made by the permission determining unit 87, to an appropriate value.

In step S20, the steering effort assist controlling apparatus 71 outputs the correction current data for the assist motor 35 which is obtained through the current limitation process performed by the current limiting unit 89, to the adding unit 75, and then ends the process.

After that, the adding unit 75 of the EPS control apparatus 51 adds the value of the base current for the assist motor 35 which is obtained through the conversion performed by the first torque current converter 73, to the value of the correction current for the assist motor 35 which is obtained through the current limitation process performed by the current limiting unit 89, and outputs the result as assist current data for the assist motor 35. Receiving the output, the EPS control apparatus 51 exerts control so that the value of the actual current flowing through the assist motor 35 is changed in accordance with the assist current data for the assist motor 35 which is obtained through the addition performed by the adding unit 75. In this way, the EPS control apparatus 51 operates so that a steering force required when the driver turns the steering wheel 13 is reduced.

Effects Exerted by Electric Power Steering Apparatus 11 and Steering Effort Assist Controlling Apparatus 71 According to the Embodiment of the Present Disclosure Effects exerted by the electric power steering apparatus 11 and the steering effort assist controlling apparatus 71 according to the embodiment of the present disclosure will be described.

The electric power steering apparatus 11 according to a first aspect provides a steering assist force to a steering system of a vehicle by controlling driving of the assist motor 35 in accordance with a steering force acting on the steering wheel (steering member) 13. The electric power steering apparatus 11 includes the yaw rate sensor (measured-yaw-rate acquiring unit) 55 that acquires a measured yaw rate of the vehicle, the vehicle speed sensor (vehicle-speed detecting unit) 53 that detects the speed of the vehicle, the steering angle sensor (steering-angle detecting unit) 26 that detects the steering angle of the steering wheel (steering member) 13, and the steering-angle standard yaw-rate calculating unit 91 that calculates a steering-angle standard yaw rate by using the speed of the vehicle and the steering angle of the steering wheel (steering member) 13. The electric power steering apparatus 11 also includes the torque estimating apparatus 77 that estimates a self-aligning torque occurring on a steered wheel of the vehicle, on the basis of the speed of the vehicle and any one of the measured yaw rate and the steering-angle standard yaw rate, and that corrects the steering assist force on the basis of the estimated self-aligning torque. The torque estimating apparatus 77 estimates the self-aligning torque on the basis of the speed of the vehicle and data having a smaller absolute value among the measured yaw rate and the steering-angle standard yaw rate.

The torque estimating apparatus 77 estimates the self-aligning torque on the basis of the vehicle speed and data having a smaller absolute value among the measured yaw rate and the steering-angle standard yaw rate.

There are two significances for the torque estimating apparatus 77 estimating the self-aligning torque on the basis of the vehicle speed and data having a smaller absolute value among the measured yaw rate and the steering-angle standard yaw rate. The first significance is ensuring of reliability of the electric power steering apparatus 11, for example, when either of the measured yaw rate and the steering-angle standard yaw rate is larger than its proper value. The second significance is avoidance of a situation in which the steering wheel (steering member) 13 goes into a self-steering state, for example, when the vehicle which is turning travels on a positive cant road.

According to the first aspect of the present disclosure for the electric power steering apparatus 11, even if a situation in which the measured yaw rate or the steering-angle standard yaw rate has an abnormal value (larger value) compared with its proper value occurs, the adverse effect of the abnormal value is avoided before the effect is shown, whereby excellent steering feeling felt when the steering wheel is held to keep the vehicle turning is maintained, causing reliability of the electric power steering apparatus 11 to be ensured.

According to a second aspect of the present disclosure, the steering effort assist controlling apparatus 71 is presumed which exerts control for supporting a steering holding state of a vehicle in such a manner that the steering effort assist controlling apparatus 71 determines whether or not the vehicle which is turning is in the steering holding state, in such a manner that, if the steering effort assist controlling apparatus 71 determines that the vehicle which is turning is in the steering holding state, the steering effort assist controlling apparatus 71 controls driving of the assist motor 35 in accordance with a steering force acting on the steering wheel (steering member) 13, and in such a manner that the steering effort assist controlling apparatus 71 provides a steering assist force to a steering system of the vehicle.

According to the second aspect of the present disclosure for the steering effort assist controlling apparatus 71, the steering-angle standard yaw-rate calculating unit 91 included in the torque estimating apparatus 77 uses the vehicle speed and the steering angle of the steering wheel (steering member) 13 to calculate the steering-angle standard yaw rate. The torque estimating apparatus 77 estimates the self-aligning torque on the basis of the vehicle speed and data having a smaller absolute value among the measured yaw rate and the steering-angle standard yaw rate, and corrects the steering assist force on the basis of the estimated self-aligning torque. Thus, the steering torque produced when the steering wheel is held to keep the vehicle turning is reduced.

According to the second aspect of the present disclosure for the steering effort assist controlling apparatus 71, similarly to the first aspect of the present disclosure for the electric power steering apparatus 11, even if a situation in which the measured yaw rate or the steering-angle standard yaw rate has an abnormal value (larger value) compared with its proper value occurs, the adverse effect of the abnormal value is avoided before the effect is shown, whereby excellent steering feeling felt when the steering wheel is held to keep the vehicle turning is maintained, causing reliability of the steering effort assist controlling apparatus 71 included in the electric power steering apparatus 11 to be ensured.

In the steering effort assist controlling apparatus 71 according to a third aspect of the present disclosure, in the case where the measured yaw rate exceeds a turning threshold, where a steering speed of the steering wheel (steering member) 13 is less than a speed threshold, and where a state in which the cruise control apparatus 57 mounted on the vehicle has been actuated continues for a predetermined time or more, it is determined that the vehicle which is turning is in the steering holding state.

According to the third aspect of the present disclosure for the steering effort assist controlling apparatus 71, the condition used when it is determined that the vehicle which is turning is in the steering holding state is clearly defined, whereby convenience may be provided for design in implementation of the steering effort assist controlling apparatus 71 according to the present disclosure on the vehicle.

In the steering effort assist controlling apparatus 71 according to a fourth aspect of the present disclosure, the control for supporting the steering holding state of the vehicle is stopped in the case where the measured yaw rate is less than the turning threshold, where the cruise control apparatus 57 is not actuated, or where the steering force acting on the steering wheel (steering member) 13 exceeds a steering-power threshold.

According to the fourth aspect of the present disclosure for the steering effort assist controlling apparatus 71, the condition used when control for supporting the steering holding state of the vehicle is stopped is clearly defined, whereby convenience may be provided for design in implementation of the steering effort assist controlling apparatus 71 according to the present disclosure on the vehicle, and contribution to reduced energy requirements may be achieved.

OTHER EMBODIMENTS

The embodiment described above indicates an exemplary embodiment of the present disclosure. Therefore, it should not be used to interpret the technical scope of the present disclosure restrictively. This is because the present disclosure may be embodied in various forms without departing from the gist or the main characteristics of the present disclosure.

What is claimed is:
1. An electric power steering apparatus; comprising:
   a steering member of a vehicle;
   an assist motor configured apply a steering assist force to the steering member in accordance with a steering force acting on the steering member;
   a measured-yaw-rate acquiring unit that acquires a measured yaw rate of the vehicle;
   a vehicle-speed detecting unit that detects a speed of the vehicle;
   a steering-angle detecting unit that detects a steering angle of the steering member;
   a steering-angle standard yaw-rate calculating unit that calculates a steering-angle standard yaw rate from the speed of the vehicle and the steering angle of the steering member; and
   a torque estimating apparatus that estimates a self-aligning torque occurring on a steered wheel of the vehicle, on the basis of (i) the speed of the vehicle and (ii) either of the measured yaw rate or the steering-angle standard yaw rate, whichever is smaller, and that corrects the steering assist force on the basis of the estimated self-aligning torque, the corrected steering assist force being applied to the steering member through the assist motor.

2. A steering holding-state assist controlling apparatus for a vehicle provided with a steering assist control which controls an assist motor to apply a steering assist force to a steering member in accordance with a steering action applied to the steering member by a driver in the vehicle, the apparatus comprising:
   a steering holding-state determining unit configured to determine whether or not the vehicle is in a steering holding-state in which the steering member is steered and held in the steered state by the driver;
   a steering-angle standard yaw-rate calculating unit that calculates a steering-angle standard yaw rate from a speed of the vehicle and a steering angle of the steering member of the vehicle; and
   a torque estimating apparatus that estimates a self-aligning torque occurring on a steered wheel of the vehicle, on the basis of (i) the speed of the vehicle and (ii) either of a measured yaw rate or the steering-angle standard yaw rate, whichever is smaller, and that corrects the steering assist force on the basis of the estimated self-aligning torque,
   wherein the steering holding-state assist controlling apparatus is configured to output the corrected steering assist force to control the assist motor, thereby assisting the steering holding state of the steering member, when the steering holding-state determining unit determines that the vehicle is in the steering holding-state.

3. The steering holding-state assist controlling apparatus according to claim 2,
   wherein the steering holding-state determining unit determines that the vehicle is in the steering holding-state if the following conditions (1)-(3) continue for a predetermined time or more:
   (a-1) the measured yaw rate exceeds a turning threshold;
   (a-2) a steering speed of the steering member is less than a speed threshold; and
   (a-3) a cruise control apparatus installed on the vehicle is actuated.

4. The steering holding-state assist controlling apparatus according to claim 3,
wherein the steering holding-state assist controlling apparatus is configured to stop the control of assisting the steering holding-state of the vehicle if any one of the following conditions is satisfied:
(b-1) the measured yaw rate is less than the turning threshold;
(b-2) the cruise control apparatus is not actuated; or
(b-3) the steering force acting on the steering member exceeds a steering-power threshold.

* * * * *